(12) United States Patent
Sano

(10) Patent No.: US 10,914,940 B2
(45) Date of Patent: Feb. 9, 2021

(54) SCANNING OPTICAL DEVICE

(71) Applicant: CANON KABUSHIKI KAISHA, Tokyo (JP)

(72) Inventor: Atsushi Sano, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 136 days.

(21) Appl. No.: 16/135,967

(22) Filed: Sep. 19, 2018

(65) Prior Publication Data

US 2019/0094530 A1 Mar. 28, 2019

(30) Foreign Application Priority Data

Sep. 28, 2017 (JP) ................................. 2017-187434

(51) Int. Cl.
*G02B 26/08* (2006.01)
*G02B 26/10* (2006.01)
*G02B 26/12* (2006.01)

(52) U.S. Cl.
CPC ......... *G02B 26/124* (2013.01); *G02B 26/105* (2013.01); *G02B 26/122* (2013.01)

(58) Field of Classification Search
CPC combination set(s) only.
See application file for complete search history.

(56) References Cited

U.S. PATENT DOCUMENTS

| 2002/0039221 A1* | 4/2002 | Shiraishi | G02B 26/123 359/204.1 |
|---|---|---|---|
| 2008/0130078 A1* | 6/2008 | Okuwaki | G02B 26/123 359/204.1 |
| 2008/0174763 A1* | 7/2008 | Ehbets | G01J 3/02 356/51 |

FOREIGN PATENT DOCUMENTS

| JP | 2009-36854 A | 2/2009 |
|---|---|---|
| JP | 4275775 B2 | 6/2009 |
| JP | 2011137925 A * | 7/2011 |

* cited by examiner

*Primary Examiner* — Mustak Choudhury
(74) *Attorney, Agent, or Firm* — Canon U.S.A., Inc. I.P. Division

(57) ABSTRACT

The spot diameter of a laser beam emitted from a first light source, passing through a first stop member, and focused on an object to be scanned is smaller than the spot diameter of a laser beam emitted from a second light source, passing through a second stop member, and focused on an object to be scanned. After the focal depth at the spot diameter of the laser beam emitted from the first light source, passing through the first stop member, and focused on the object to be scanned is adjusted by moving a first holding member holding the first light source at least in the emission direction of the laser beam from the light source, the first holding member and a housing member are bonded with an adhesive, and the first holding member is positioned and fixed to the housing member.

12 Claims, 14 Drawing Sheets

SCANNING OPTICAL DEVICE

BACKGROUND OF THE INVENTION

Field of the Invention

The present disclosure generally relates to image forming processing and more specifically to a scanning optical device that deflects and scans a light beam with a light deflector, such as a rotating polygon mirror, and using an imaging optical system, focuses the light beam on an object to be scanned, such as a photosensitive drum, into a spot shape.

Description of the Related Art

Conventionally, in a scanning optical device used in a printer, a copying machine, or the like, a light beam modulated and emitted from a light source in accordance with an image signal is periodically deflected and scanned by a light deflector such as a rotating polygon mirror and is focused in a spot shape on an image forming surface on a photosensitive drum by an imaging optical system. The spot on the image forming surface forms an electrostatic latent image in accordance with the main scanning by the light deflector and the sub-scanning by the rotation of the photosensitive drum to perform image recording. When this scanning optical device is applied to a color image forming apparatus, images of four colors of yellow (Y), magenta (M), cyan (C), and black (K), for example, are superimposed to form a color image on a sheet.

Japanese Patent Laid-Open No. 2009-36854 discloses an embodiment in which light sources and collimator lenses of yellow (Y), magenta (M), cyan (C), and black (K) are attached to one laser holder to form an optical unit, and focus adjustment is performed in the state of this optical unit. A color image forming apparatus equipped with this optical unit generally has a color mode for printing a color image and a monochrome mode for printing only a monochrome image.

Recently, also in color image forming apparatuses, the demand for higher image quality monochrome images has increased.

In the configuration of the light source unit of the scanning optical device of the color image forming apparatus described in Japanese Patent Laid-Open No. 2009-36854, the focus adjustment of yellow (Y), magenta (M), cyan (C), and black (K) is performed by the same method. That is, in any color, focus adjustment is performed by moving the collimator lens in the emission direction of the laser beam.

Conventionally, since the spot diameter of the laser beam focused on the photosensitive drum is set to be the same for all four colors, it is difficult to simply improve the image quality of monochrome images. One way to enhance image quality of monochrome images is to reduce the spot diameter as described in Japanese Patent No. 4275775. As a method for achieving the reduction of the spot diameter, the stop diameter may be increased.

However, in the light source unit including the adjustment of Japanese Patent Laid-Open No. 2009-36854, if the stop diameter of black is increased in order to reduce the spot diameter of black, the spot focal depth of black decreases. When the spot focal depth decreases, the spot diameter can abruptly increase, for example, when the distance between the scanning optical device and the photosensitive drum changes and the focusing point changes. This leads to deterioration of image quality.

SUMMARY OF THE INVENTION

The present disclosure reduces the spot diameter of a laser beam focused on an object to be scanned from one of a plurality of light sources, and maintains image quality without decreasing the focal depth at the spot diameter.

According to an aspect of the present disclosure, a scanning optical device includes a first holding member holding a first light source, a second holding member holding a second light source, a first stop member shaping a laser beam emitted from the first light source, a second stop member shaping a laser beam emitted from the second light source, a deflection scanning unit deflecting and scanning the laser beams from the light sources passing through the stop members, scanning lenses focusing the laser beams from the light sources deflected and scanned by the deflection scanning unit on objects to be scanned corresponding to the light sources, a housing member holding the holding members, the stop members, the deflection scanning unit, and the scanning lenses, protruding portions provided in the housing and used for fixing the first holding member to the housing with an adhesive, and adhesion portions provided in the first holding member and opposed to the protruding portions of the housing member so as to be movable in the emission direction of the laser beam from the light source. Of the spot diameters of the laser beams focused on the objects to be scanned, the spot diameter of the laser beans emitted from the first light source, passing through the first stop member, and focused on the object to be scanned is smaller than the spot diameter of the laser beam emitted from the second light source, passing through the second stop member, and focused on the object to be scanned. After the focal depth at the spot diameter of the laser beam emitted from the first light source, passing through the first stop member, and focused on the object to be scanned is adjusted by moving the first holding member at least in the emission direction, the adhesion portions and the protruding portions are bonded with the adhesive, and the first holding member is positioned and fixed to the housing member.

Further features of the present disclosure will become apparent from the following description of exemplary embodiments with reference to the attached drawings.

DESCRIPTION OF THE EMBODIMENTS

Preferred embodiments of the present disclosure will be described in detail below with reference to the accompanying drawings. However, the dimensions, materials, shapes, relative positions, and the like of the components described in the following embodiments should be appropriately changed depending on the configuration of the apparatus to which the present disclosure is applied and various conditions. Therefore, unless otherwise specified, the scope of the present disclosure is not limited to them.

Image Forming Apparatus

Figure 1:
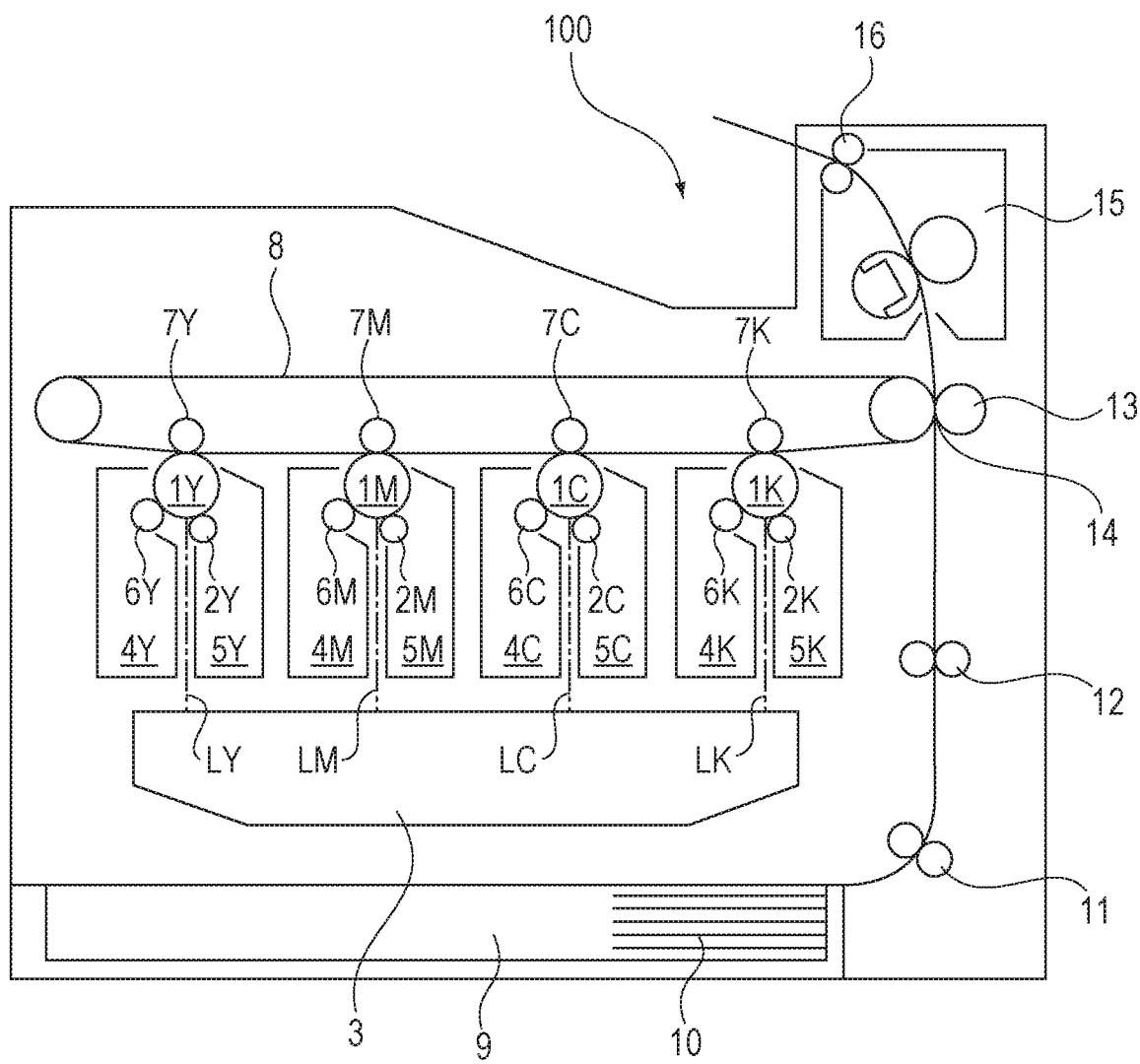
FIG. 1 is a schematic sectional view of an image forming apparatus in which a scanning optical device according to an embodiment is mounted.

With reference to FIG. 1, the configuration of a color image forming apparatus 100 having a scanning optical device 3 according to this embodiment will be described. FIG. 1 is a sectional explanatory view showing the configuration of a color image forming apparatus 100 having a scanning optical device 3 according to this embodiment.

The image forming apparatus 100 shown in FIG. 1 is an electrophotographic color image forming apparatus that includes developers (toners) of four colors of yellow (Y), magenta (M), cyan (C), and black (K), and forms a toner image on a recording material 10.

In FIG. 1, the surfaces of photosensitive drums 1Y, 1M, 1C, and 1K serving as image bearing members uniformly charged by charging rollers 2Y, 2M, 2C, and 2K serving as charging units are irradiated with laser beams LY, LM, LC, and LK. The laser beams LY, LM, LC, and LK are emitted from a scanning optical device 3 serving as an exposure unit corresponding the respective laser beams based on image data from an image data input unit (not shown). As a result, electrostatic latent images are formed on the surfaces of the photosensitive drums 1Y, 1M, 1C, and 1K.

The electrostatic latent images formed on the surfaces of the photosensitive drums 1Y, 1M, 1C, and 1K are supplied with toner of respective colors and developed by developing rollers 6Y, 6M, 6C, and 6K in the developing devices 4Y, 4M, 4C, and 4K serving as developing units. As a result, toner images of respective colors are formed on the surfaces of the photosensitive drums 1Y, 1M, 1C, and 1K.

An intermediate transfer belt 8 serving as an image bearing member is stretched so as to face the photosensitive drums 1Y, 1M, 1C, and 1K. The toner images of respective colors formed on the surfaces of the photosensitive drums 1Y, 1M, 1C, and 1K are sequentially primarily transferred onto the outer peripheral surface of the intermediate transfer belt 8. This primary transfer is performed by applying a primary transfer bias voltage to primary transfer rollers 7Y, 7M, 7C, and 7K serving as primary transfer units disposed on the inner peripheral surface side of the intermediate transfer belt 8.

On the other hand, a recording material 10 is stored in a feeding cassette 9. After being fed by a feeding roller 11, the recording material 10 is conveyed by a conveying roller 12.

Thereafter, at a predetermined timing, the recording material 10 is conveyed to a secondary transfer portion 14 that is a nip portion between the intermediate transfer belt 8 and a secondary transfer roller 13 serving as a secondary transfer unit. By applying a secondary transfer bias voltage to the secondary transfer roller 13, the toner image on the outer peripheral surface of the intermediate transfer belt 8 is transferred to the recording material 10.

Thereafter, the recording material 10 is nipped and conveyed between the secondary transfer roller 13 of the secondary transfer portion 14 and the intermediate transfer belt 8, and sent to a fixing device 15 serving as a fixing unit. Then, the toner image is fixed to the recording material 10 by being heated and pressed by the fixing device 15, and the recording material 10 is conveyed by a discharge roller 16.

Scanning Optical Device

Figure 2:
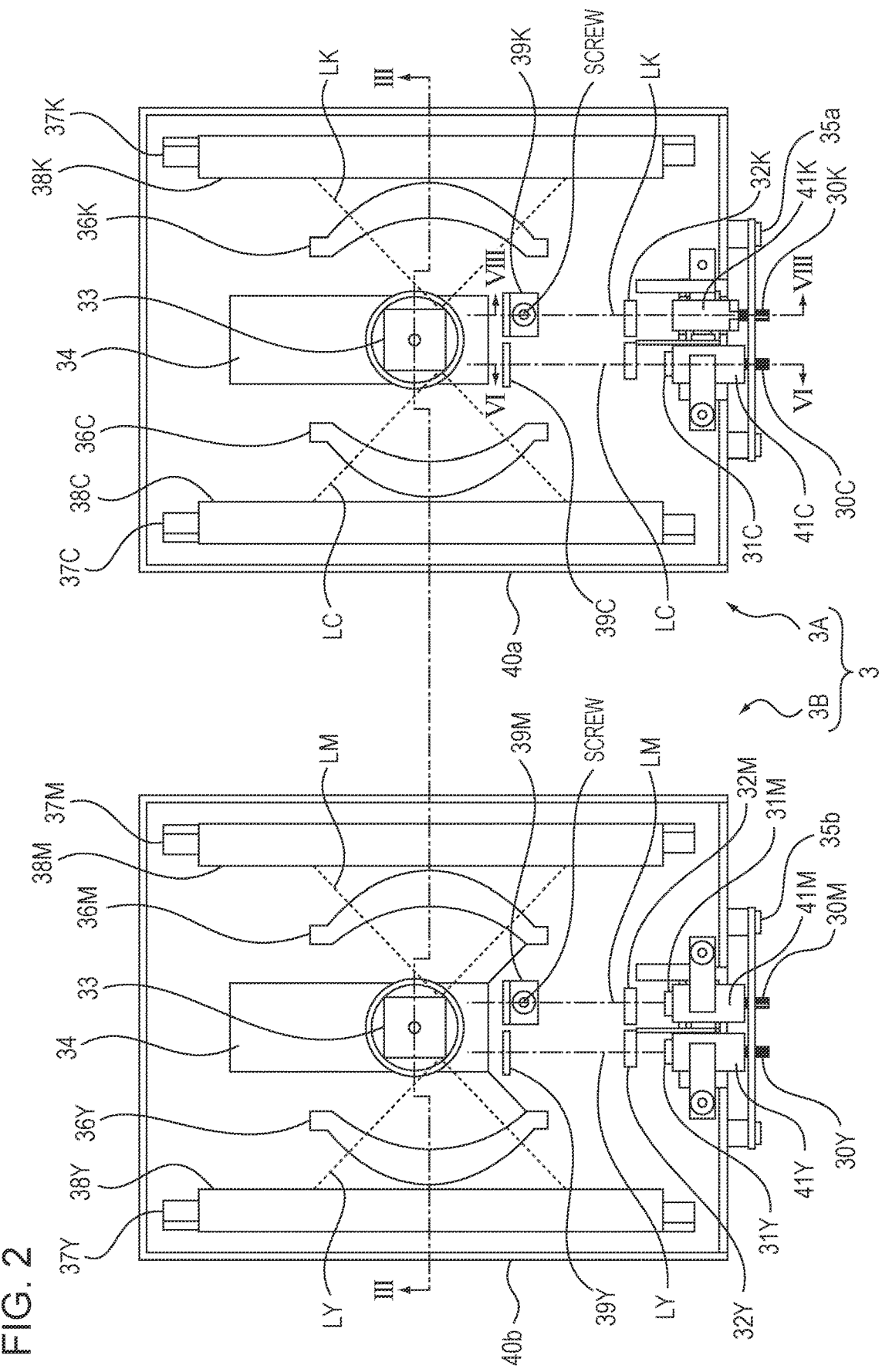
FIG. 2 is a top view showing the scanning optical device according to the embodiment.

Next, the overall configuration of the scanning optical device 3 will be described with reference to FIGS. 2 and 3. FIG. 2 is a top view of the scanning optical device 3 according to this embodiment, and FIG. 3 is a sectional view taken along line III-III of FIG. 2.

Figure 3:
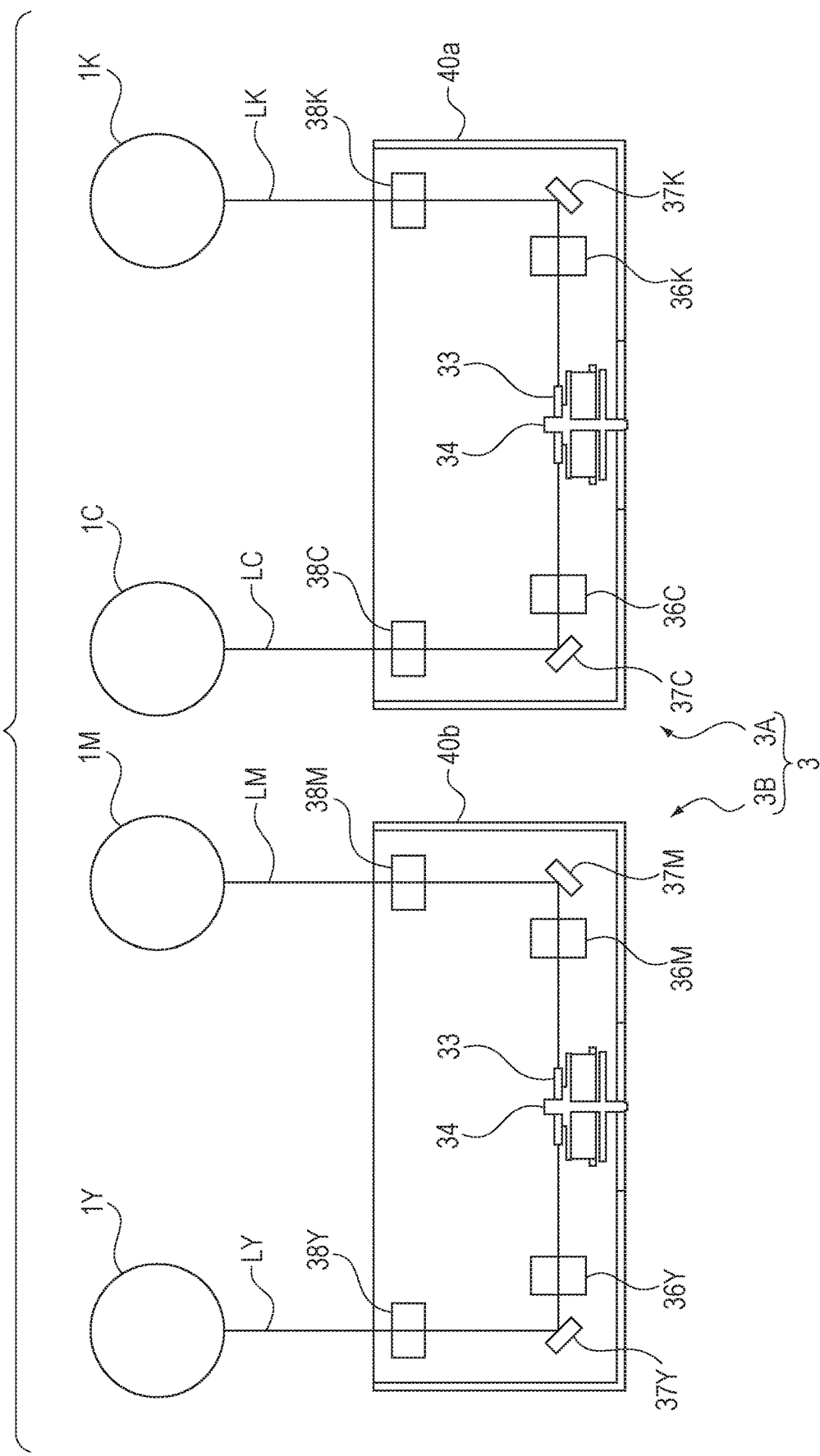
FIG. 3 is a sectional view taken along line of FIG. 2.

As shown in FIGS. 2 and 3, in this embodiment, the scanning optical device 3 includes a scanning optical device 3A for irradiating the photosensitive drums 1C and 1K with laser beams LC and LK, and a scanning optical device 3B for irradiating the photosensitive drums 1Y and 1M with laser beams LY and LM. By scanning the surfaces of first and second photosensitive drums with laser beams emitted from the scanning optical devices, electrostatic latent images are formed on the surfaces of the first and second photosensitive drums.

The scanning optical device 3A includes semiconductor lasers 30C and 30K, light source holders 42C and 42K, apertures 39C and 39K, a rotating polygon mirror 33, and first scanning lenses 36C and 36K, which are held in a housing 40a serving as a housing member.

Similarly, the scanning optical device 3B includes semiconductor lasers 30Y and 30M, light source holders 42Y and 42M, apertures 39Y and 39M, a rotating polygon mirror 33, and first scanning lenses 36Y and 36M, which are held in a housing 40b serving as a housing member.

The light source holder 42K is a first holding member that holds the semiconductor laser 30K, which is a first light source. The light source holders 42Y, 42M, and 42C are second holding members that hold the semiconductor lasers 30Y, 30M, and 30C, which are second light sources. The aperture 391K is a first stop member for shaping the laser beam LK emitted from the semiconductor laser 30K and has a hole 39K1 (see FIG. 4) through which only part of the laser beam LK passes. The apertures 39Y, 39M, and 39C are second diaphragm members for shaping the laser beams LY, LM, and LC emitted from the semiconductor lasers 30Y, 30M, and 30C. The apertures 39Y, 39M, and 39C have holes 39Y1, 39M1, and 39C1 (see FIGS. 4 and 10) through which only parts of the laser beams LY, LM, and LC pass. The rotating polygon mirror 33 is a deflection scanning unit for deflecting and scanning the laser beams LY, LM, LC, and LK from the semiconductor lasers 30Y, 30M, 30C, and 30K passing through the apertures 39Y, 39M, 39C, and 39K. The scanning lenses 36Y, 36M, 36C, and 36K are scanning lenses that focus laser beams from the semiconductor lasers deflected and scanned by the rotating polygon mirror 33 on photosensitive drums serving as objects to be scanned corresponding to the semiconductor lasers.

The laser beams LM, and LC emitted from the semiconductor lasers 30Y, 30M, and 30C, which are second light sources driven and controlled by laser drive circuits 35a and 35b, are converted into collimated laser beams by collimator lenses 31Y, 31M, and 31C. The laser beams LY, LM, and LC pass through cylindrical lenses 32Y, 32M, and 32C, pass through the apertures 39Y, 39M, and 39C, which are second stop members, converge only in the sub-scanning direction, and are focused as line images on the reflecting surfaces of the rotating polygon mirrors 33 on scanner motors 34.

On the other hand, the laser beam LK emitted from the semiconductor laser 30K, which is a first light source driven and controlled by the laser drive circuit 35a, passes through an anamorphic lens 32K, passes through the aperture 39K, which is a first stop member, and is focused as a line image on the reflecting surface of the rotating polygon mirror 33.

The laser beams LM, LC, and LK deflected by the rotating polygon mirrors 33, which are deflection scanning units, pass through the first scanning lenses 36Y 36M, 36C, and 36K, respectively, and are reflected by the mirrors 37Y, 37M, 37C, and 37K. Thereafter, the reflected laser beams LY, LM, LC, and LK pass through the second scanning lenses 38Y, 38M, 38C, and 38K, respectively, and are focused on the photosensitive drums 1Y, 1M, 1C, and 1K.

In the scanning optical device 3A, the semiconductor lasers 30C and 30K, the first scanning lenses 36C and 36K, the mirrors 37C and 37K, and the second scanning lenses 38C and 38K are arranged substantially symmetrically with respect to the scanner motor 34 and are held in the housing 40a.

As in the scanning optical device 3A, also in the scanning optical device 3B, the respective members are held in a substantially symmetrically arranged state. That is, in the scanning optical device 3B, the semiconductor lasers 30Y and 30M, the first scanning lenses 36Y and 36M, the mirrors 37Y and 37M, and the second scanning lenses 38Y and 38M are arranged substantially symmetrically with respect to the scanner motor 34 and are held in the housing 40b.

With such an optical system, scanning light is guided onto the four photosensitive drums 1Y, 1M, 1C, and 1K, which are objects to be scanned, to perform image recording. Specifically, the angle at which the laser beams LY, LM, LC, and LK are deflected changes due to the rotation of the rotating polygon mirrors 33, and the spot images formed by the laser beams LY, LM, LC, and LK are moved (main scanned) on the surfaces of the photosensitive drums 1Y, 1M, 1C, and 1K in the axial direction of the photosensitive drums. Due to the rotation of the photosensitive drums 1Y, 1M, 1C, and 1K, the spot images are moved (sub-scanned) on the surfaces of the photosensitive drums 1Y, 1M, 1C, and 1K in the direction orthogonal to the axial direction of the photosensitive drums. Thereby, electrostatic latent images are formed on the surfaces of the photosensitive drums 1Y, 1M, 1C, and 1K.

In this embodiment, the spot diameters of the laser beams on the photosensitive drums are set such that the spot diameter of the laser beam LK forming a monochrome image is smaller than the spot diameter of the laser beams LY, LM, and LC forming a color image.

The cylindrical lenses 32Y, 32M, and 32C, the first scanning lenses 36Y, 36M, 36C, and 36K, the mirrors 37Y. 37M, 37C, and 37K, the second scanning lenses 38Y, 38M, 38C, and 38K, and the housings 40a and 40b are common parts.

C light source portion and K light source portion.

Figure 4:
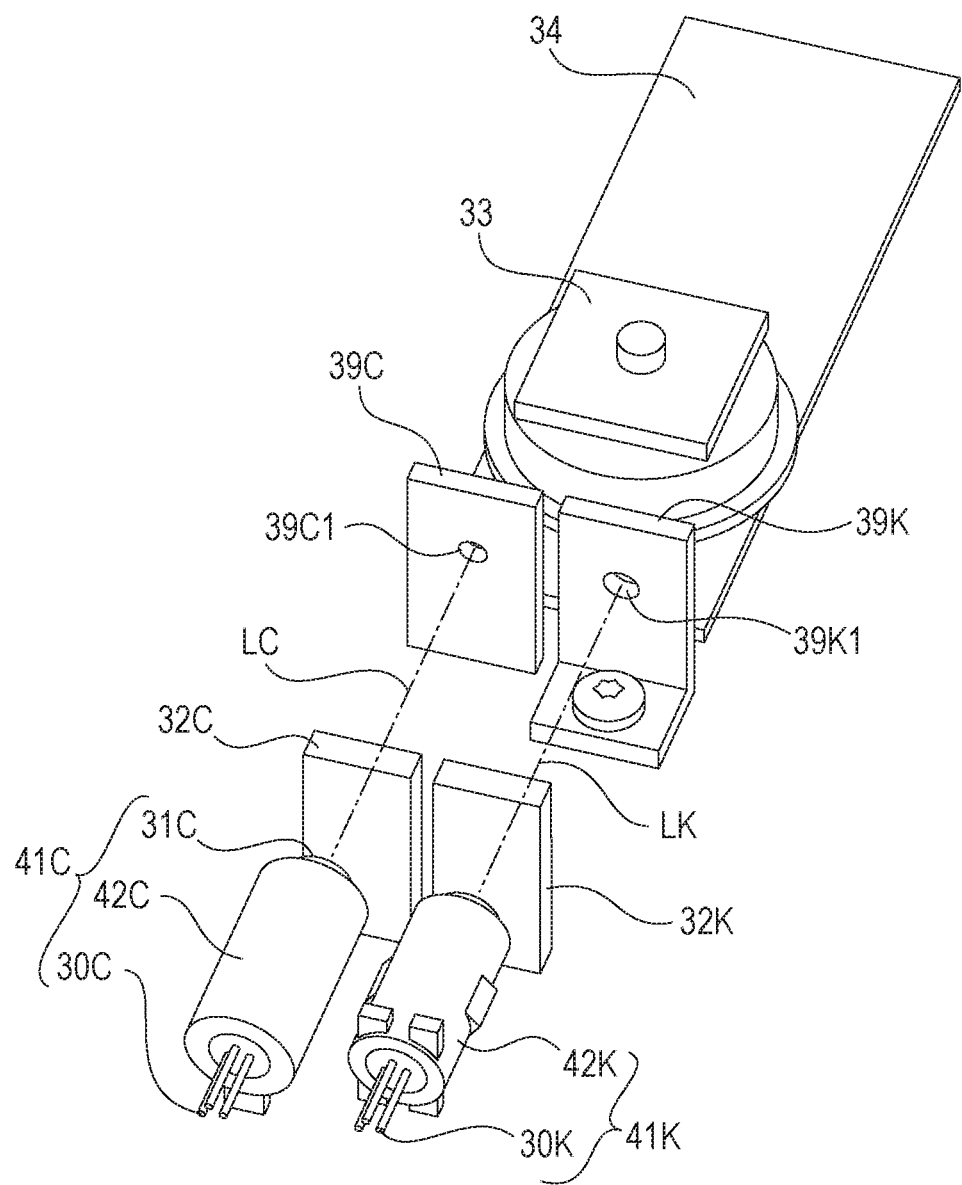
FIG. 4 is an upper perspective view of light source portions of the scanning optical device according to the embodiment.
Figure 5:
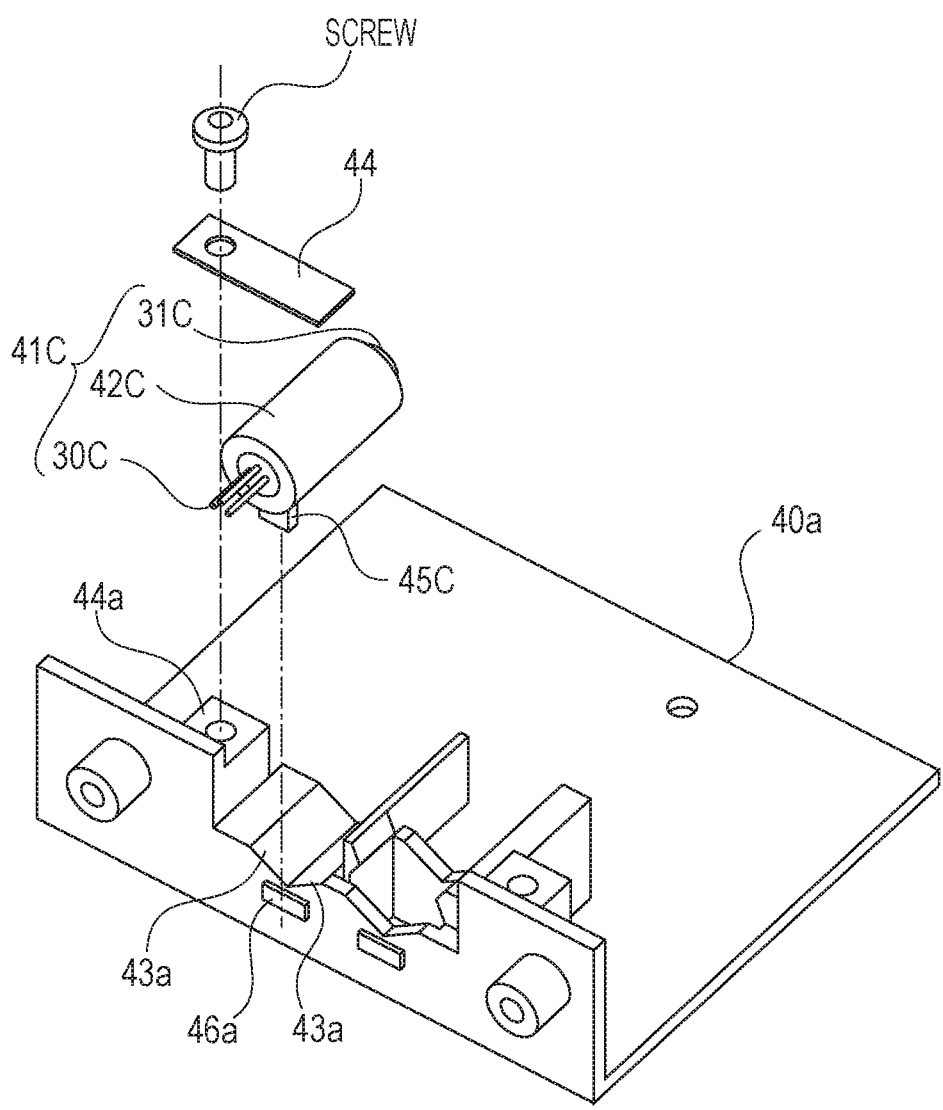
FIG. 5 is an explanatory view for explaining the configuration of a C light source portion.
Figure 6:
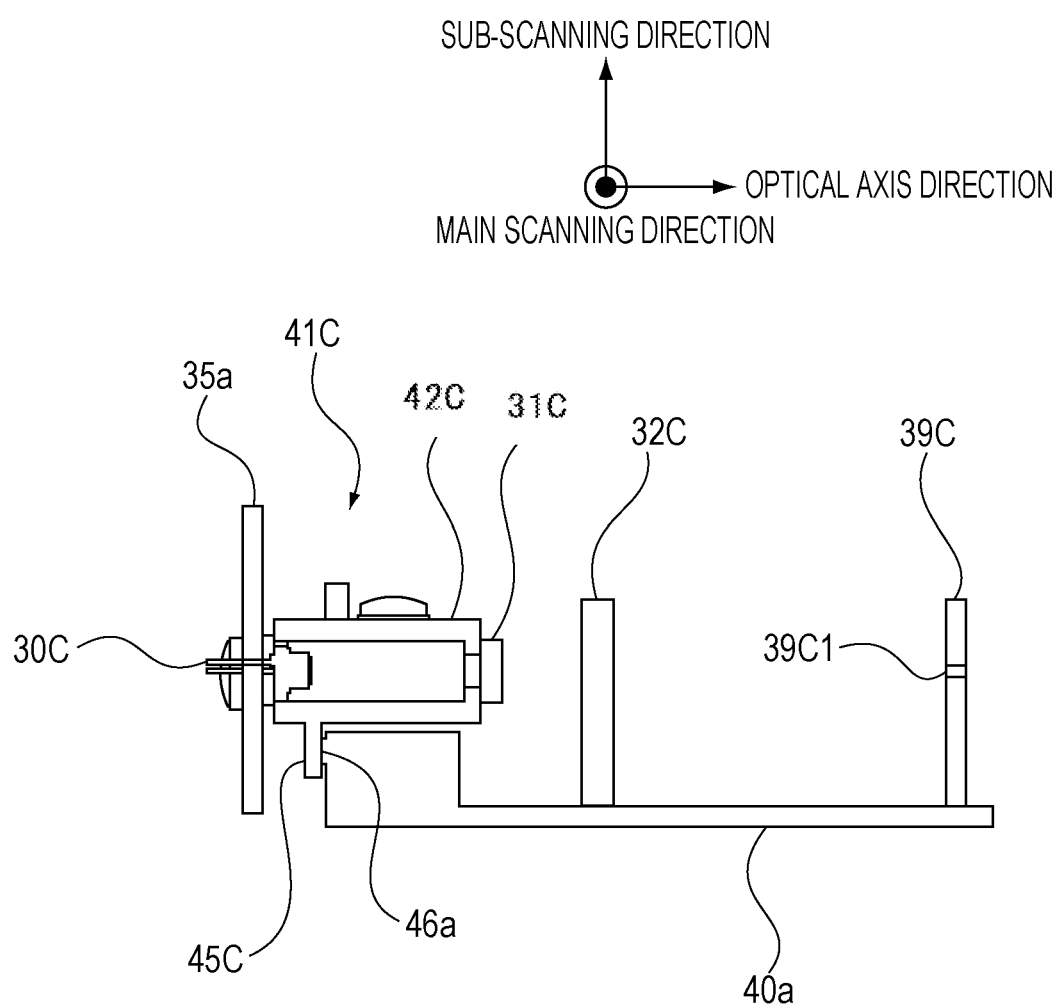
FIG. 6 is a sectional view taken along line VI-VI of FIG. 2.
Figure 7:
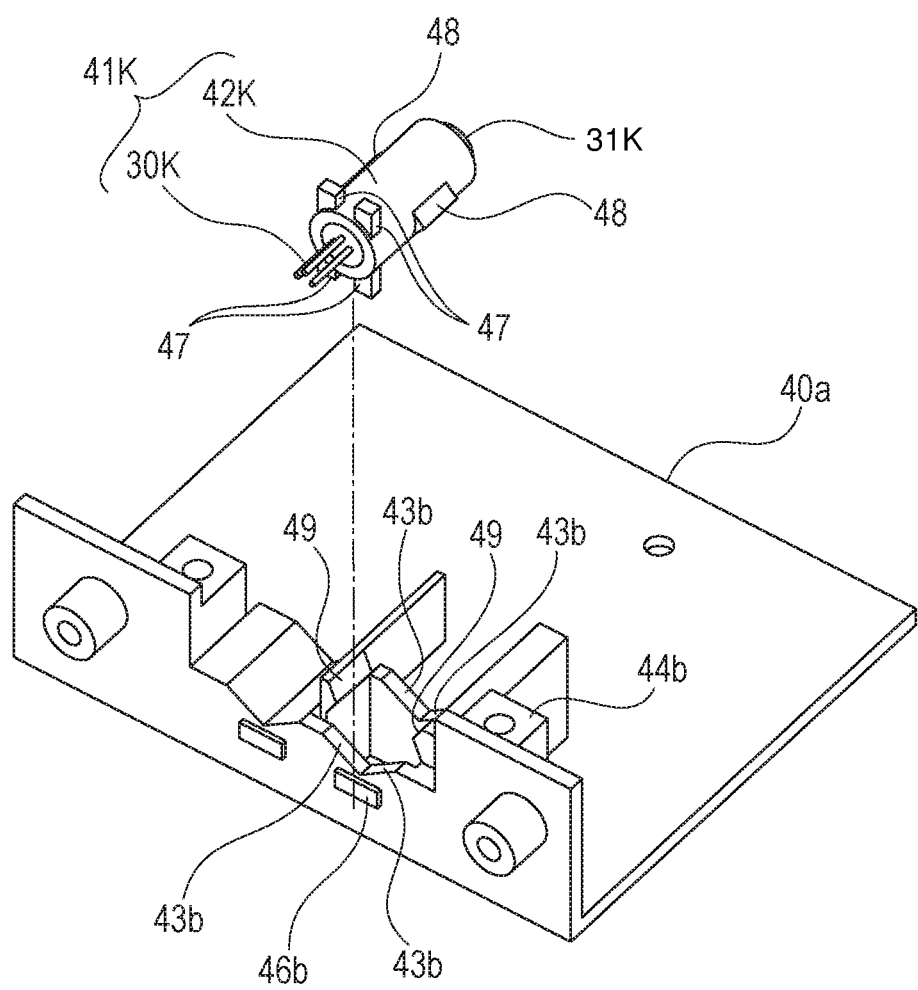
FIG. 7 is an explanatory view for explaining the configuration of a K light source portion.
Figure 8:
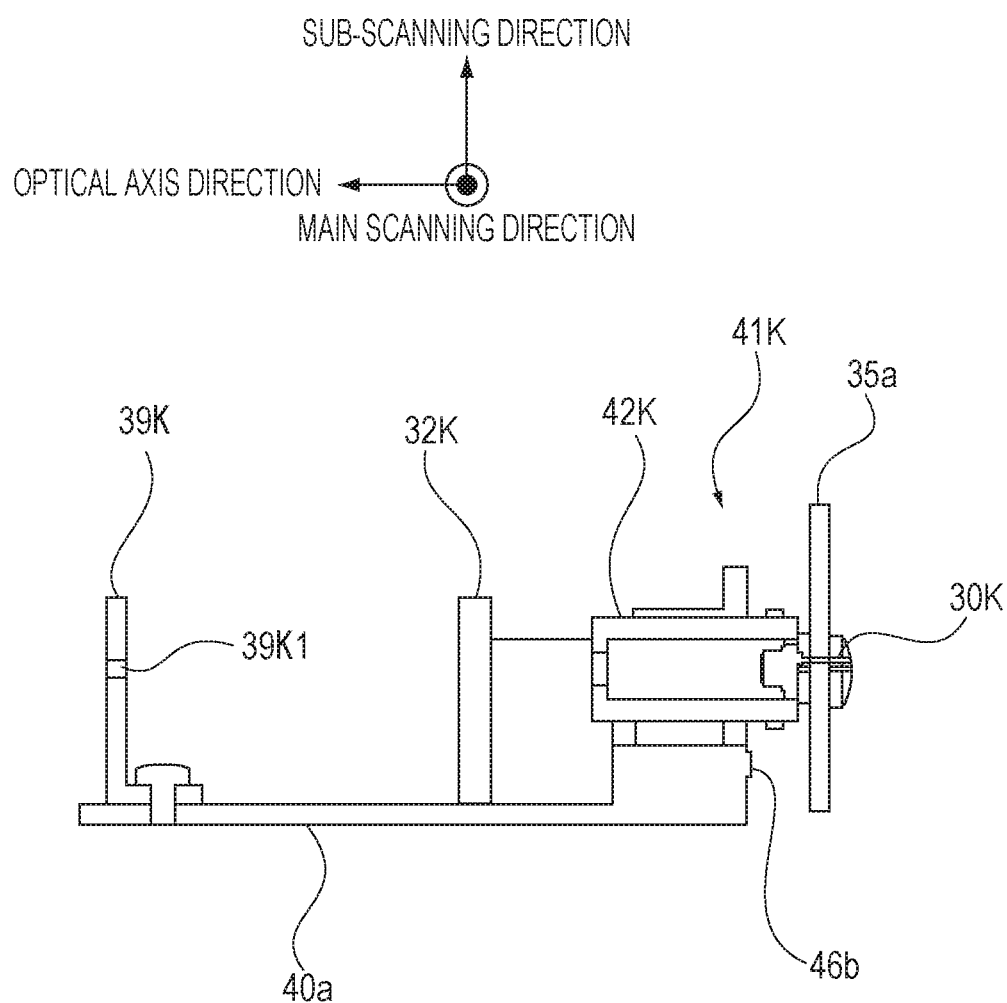
FIG. 8 is a sectional view taken along line of FIG. 2.
Figure 9:
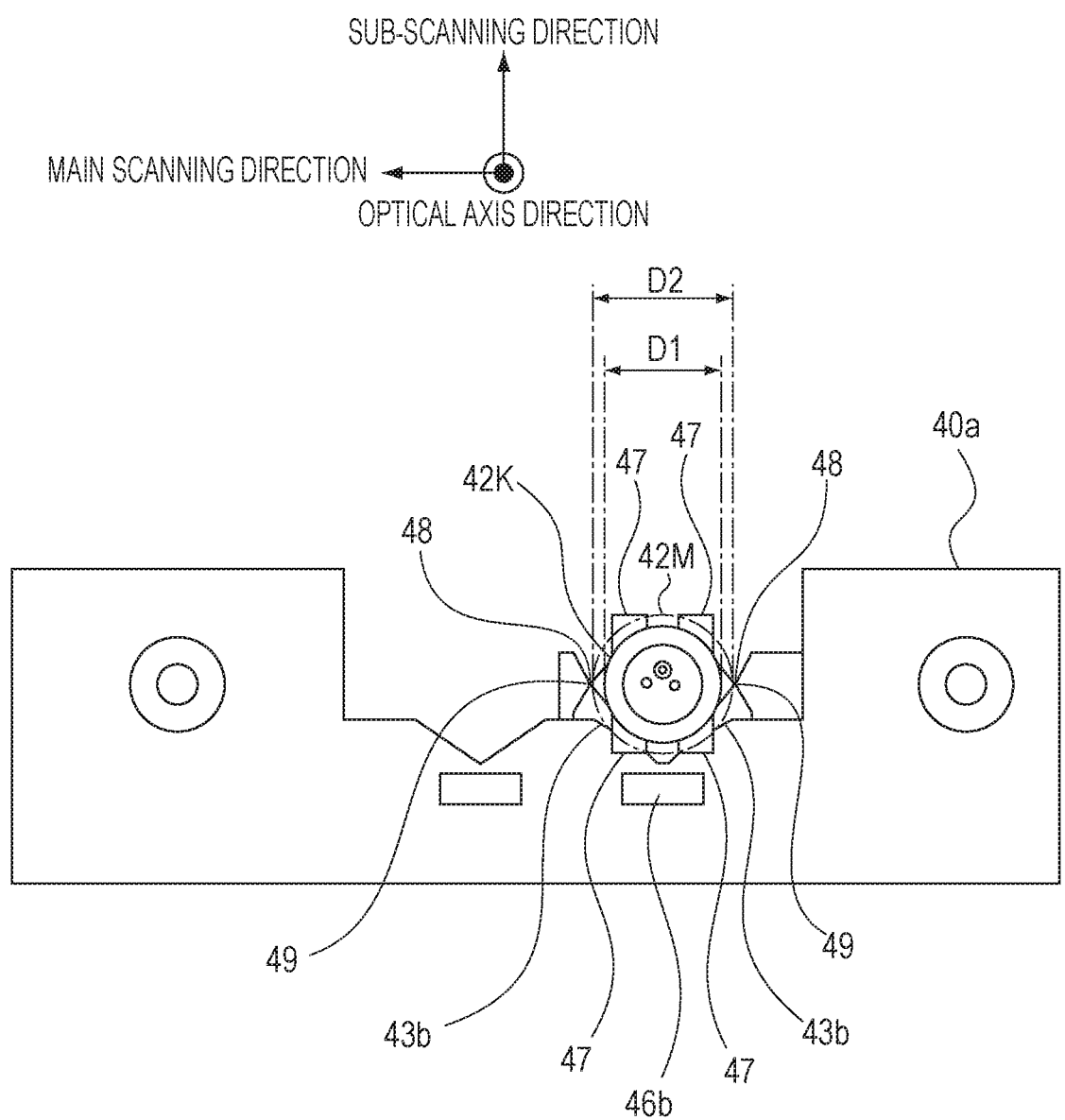
FIG. 9 is an explanatory view of the K light source portion viewed from the light source side in the scanning optical device.

Subsequently, the cyan C light source portion and the black K light source portion in the scanning optical device 3A will be described with reference to FIGS. 4 to 9. FIG. 4 is an upper perspective view of both light source portions of the scanning optical device 3A. FIG. 5 is an explanatory view for explaining the configuration of the C light source portion, and FIG. 6 is a sectional view taken along line VI-VI of FIG. 2 for explaining installation of the C light source portion in the housing 40a. FIG. 7 is an explanatory view for explaining the configuration of the K light source portion, FIG. 8 is a sectional view taken along line of FIG. 2 for explaining focus adjustment of the K light source portion in the scanning optical device, and FIG. 9 is an explanatory view viewed from the light source side for explaining focus adjustment of the K light source portion in the scanning optical device.

As described above, in this embodiment, the spot diameter of the laser beam LK focused on the photosensitive drum is set to be smaller than the spot diameter of the other laser beams, Therefore, as shown in FIG. 4, the diameter of the hole 39K1 of the aperture 39K, which is a first stop member, is made larger than the diameter of the hole 39C1 of the aperture 39C, which is a second stop member. The aperture 39K is removably fixed to the housing 40a with a screw.

Here, the C light source unit 41C of the C light source portion and the K light source unit 41K of the K light source portion in the scanning optical device 3A will be described.

First, the C light source unit 41C will be described. As shown in FIG. 5, the C light source unit 41C includes a light source holder 42C having a substantially cylindrical outer shape, a semiconductor laser 30C, and a collimator lens 31C. Before installing the C light source unit 41C in the housing 40a serving as a housing member, the position of the collimator lens 31C is adjusted by a tool (not shown), and the focus position of the laser beam LC is adjusted so as to be on the photosensitive drum 1C. After the C light source unit 41C is subjected to focus adjustment, the outer shape of the cylindrical light source holder 42C is placed in a V-shaped receiving portion 43a provided in the housing 40a, and the C light source unit 41C is pressed against the housing 40a by a leaf spring 44 serving as a pressing member. The leaf spring 44 is screwed to a base 44a serving as a fixing portion provided in the housing 40a. Regarding the optical axis direction indicated by an arrow in FIG. 6, positioning is performed by bringing the flange 45C provided in the light source holder 42C serving as a second holding member into contact with an abutting portion 46a provided in the housing 40a.

Next, the K light source unit 41K will be described. As described above, the diameter of the hole 39K1 of the aperture 39K is made larger than the diameter of the hole 39C1 of the aperture 39C in order to make the spot diameter of the laser beam LK smaller than the spot diameter of the other laser beams for color image formation. Therefore, if the K light source unit 41K has the same configuration s that of the C light source unit 41C, the focal depth of the spot diameter at the position of the photosensitive drum 1K will be smaller than that of the color image forming unit. When the focal depth of the spot diameter at the position of the photosensitive drum 1K decreases, if the distance between the photosensitive drum and the scanning optical device is changed, the spot diameter largely changes and deteriorates the image. In order to make the focal depth at the spot diameter of black equal to that of the other colors, the K light source unit of the K light source portion has a configuration different from that of the other color light source portions. Specifically, a measuring jig is placed on the scanning optical device, that is, at a position corresponding to the photosensitive drum ahead of lenses and mirrors through and by which the laser beam LK is transmitted and reflected, and position adjustment of the K light source unit 41K is performed. Here, the focal depth of the spot diameter at the position of the photosensitive drum is a range of a desired spot diameter in the traveling direction of the laser beam.

As shown in FIG. 7, the K light source unit 41K is composed of a light source holder 42K having a substantially cylindrical outer shape and a semiconductor laser 30K. On the outer periphery of the light source holder 42K serving as a first holding member, tool holding portions 47 and adhesion portions 48 are provided for position adjustment. On the other hand, the housing 40a is provided with protruding portions 49 at positions opposed to the adhesive portions 48. The protruding portions 49 are provided in the housing 40a and are protruding portions for fixing the light source holder 42K to the housing 40a with an adhesive. The adhesion portions 48 are provided in the light source holder 42K and are opposed to the protruding portions 49 of the housing 40a so as to be movable in the emission direction of the laser beam from the semiconductor laser and directions orthogonal to the emission direction.

Here, the emission direction of the laser beam from the semiconductor laser is the optical axis direction shown in FIG. 8. The directions orthogonal to the emission direction are the main scanning direction (the axial direction of the photosensitive drum) in which the laser beam is scanned by the rotation of the rotating polygon mirror 33 and the sub-scanning direction (rotation direction of the photosensitive drum) orthogonal to the main scanning direction. The rotation axis serving as the rotation center of the rotating polygon mirror 33 is orthogonal to the emission direction (optical axis direction) and the main scanning direction, and is parallel to the sub-scanning direction.

Although here the light source holder 42K serving as a first holding member and the adhesion portions 48 are the same member, the light source holder 42K serving as a first holding member and the adhesion portions 48 may be separate members. Although the housing 40a serving as a housing member and the protruding portions 49 are the same member, the housing 40a serving as a housing member and the protruding portions 49 may be separate members.

At the time of adjusting the position of the K light source unit 41K, the tool holding portions 47 are held with a tool (not shown), and an adhesive (not shown) applied at positions shown in FIGS. 8 and 9, that is, at positions where the adhesion portions 48 and the protruding portions 49 face each other, so as to straddle the adhesion portions 48 and the protruding portions 49. In this state, while monitoring the spot diameter with the measuring tool provided at the position corresponding to the photosensitive drum, the K light source unit 41K is moved in the directions of the arrows in the figure (the sub-scanning direction, the main scanning direction, and the optical axis direction), and the adhesive is cured at the position where the spot diameter becomes the smallest, and positioning and fixing is performed. The adhesive may be, for example, an ultraviolet curable type. When the semiconductor laser 30K has a plurality of light emitting points, the semiconductor laser 30K is rotated about the optical axis in addition to the arrow directions in the figure, and the interval in the sub-scanning direction between laser beams from the light emitting points is also adjusted.

In a state where the K light source unit 41K is fixed to the housing 40a, the adhesion portions 48 and the protruding portions 49 are in contact with each other with the adhesive therebetween, and the K light source unit 41K is not in contact with the abutting portion 46b provided in the housing 40a. Also, in the K light source portion of the housing 40a, two receiving portions 43b having the same V-shaped cross section as the receiving portion 43a of the C light source portion are provided in the optical axis direction with the protruding portions 49 therebetween. However, as shown in FIG. 9, the outer peripheral diameter D1 of the light source holder 42K serving as a first holding member having a cylindrical outer shape is made smaller than the outer diameter D2 of the light source holder 42C serving as a second holding member (D1<D2). Therefore, the housing 40a and the K light source unit 41K do not contact each other. As second holding members, in addition to the light source holder 42C, there are light source holders 42Y and 42M described later. The outer peripheral diameters of the light source holders 42Y and 42M are also the same outer peripheral diameter D2 as that of the light source holder 42C, and the relationship with the outer peripheral diameter D1 of the light source holder 42K serving as a first holding member is also the same (D1<D2). In FIG. 9, the light source holder 42M serving as a second holding member is indicated by an alternate long and short dash line.

As shown in FIG. 9, the protruding portions 49 are protruded such that their tips face each other with the light source holder 42K therebetween. The adhesive portions 48 are protruded such that their tips face the tips of the protruding portions 49.

After installing the C light source unit 41C and the 1 light source unit 41K, the laser drive circuit (substrate) 35a is attached to the housing 40a. Although the C light source unit 41C has been described first in this embodiment, the present disclosure is not limited to adjusting the K light source unit 41K after installing the C light source unit 41C.

The main difference in focus adjustment between the C light source unit and the K light source unit is that the focus position adjustment of the C light source unit is completed in the C light source unit 41C and the K light source unit is adjusted through the optical elements disposed in the actual housing 40a.

Consequently, the focusing of the C light source unit as a scanning optical device is affected by the installation position accuracy, posture, and the like of the optical elements disposed in the housing. However, since the K light source unit is adjusted in a state including the installation position accuracy and posture of the optical elements, even if the aperture diameter is increased, the depth of focus can be secured.

In this case, the K light source unit 41K is moved in the directions of the arrows in the figure (the sub-scanning direction, the main scanning direction, and the optical axis direction) to adjust the position, but the present disclosure is not limited to this. By moving the K light source unit 41K at least in the direction of the optical axis in FIG. 8 and adjusting the position, a desired focal depth of the spot diameter can be secured.

Y light source portion and M light source portion.

Figure 10:
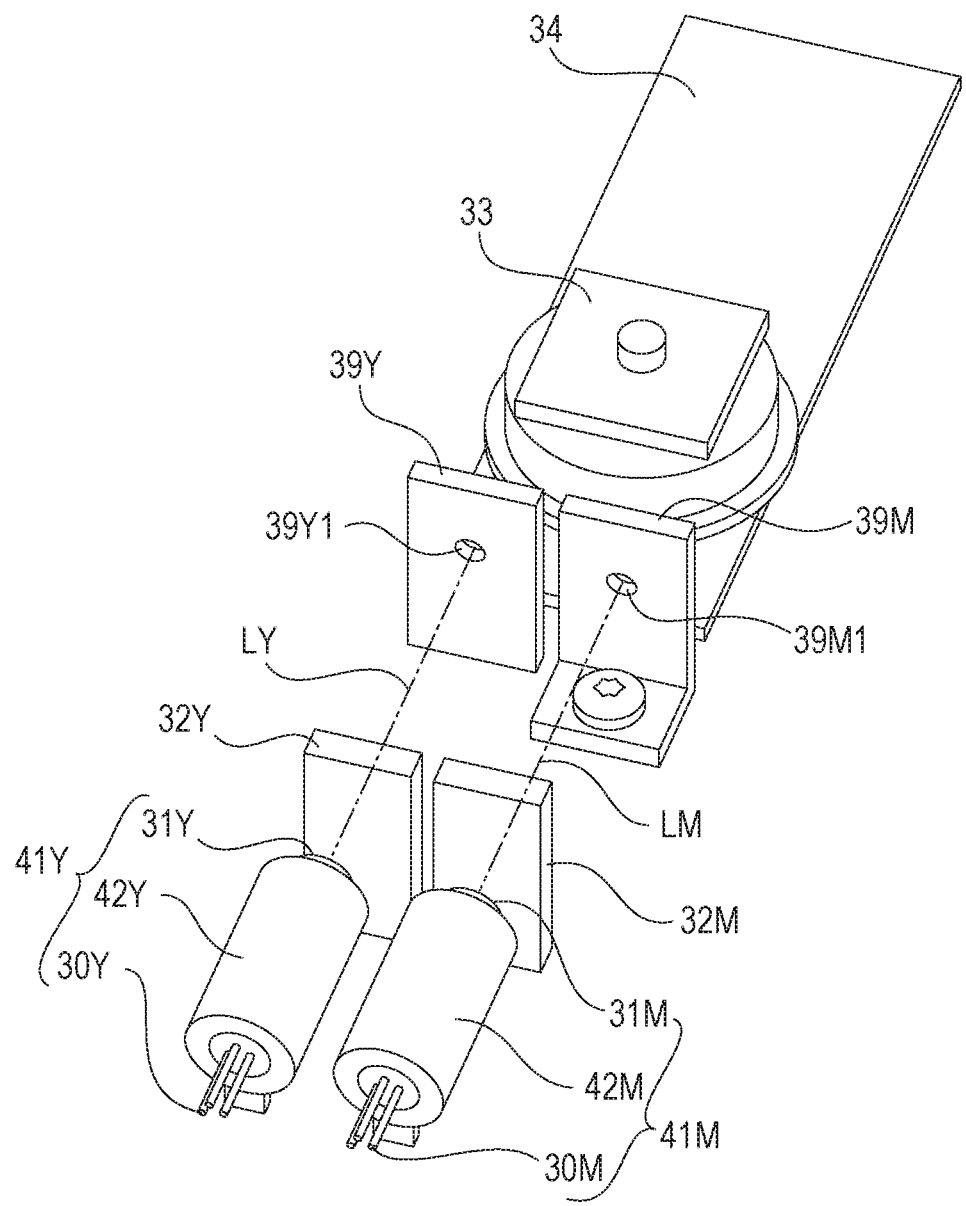
FIG. 10 is an upper perspective view of light source portions of the scanning optical device according to the embodiment.

Next, the yellow Y light source portion and the magenta M light source portion in the scanning optical device 3B will be described with reference to FIGS. 10, 11, and 12. Since the unit configuration, the focus adjustment, and the units for positioning and fixing to the housing 40b, of the Y light source unit 41Y of the Y light source portion are the same as those of the above-described C light source unit 41C, description thereof will be omitted.

The M light source portion will be described focusing on differences from the above-described K light source unit. FIG. 10 is an upper perspective view of both light source portions of the scanning optical device 3B. FIG. 11 is an explanatory view of a portion of the housing 40b to which the M light source unit 41M is attached, and FIG. 12 is a view showing a state where the M light source unit 41M is installed in the housing 40b.

Since the M light source unit 41M of the M light source portion has the same configuration as the other light source units 41Y and 41C and the focus is adjusted by the unit itself, the same aperture diameter and the same cylindrical lens 32M as the other colors are needed. The housing 40b serving as a housing member is common with the housing 40a, but one of the apertures is replaceably attached to the housing 40b Specifically, one of the apertures is replaceably fixed with a screw in advance. Therefore, it can be replaced with an aperture 39M whose hole has the same diameter as the hole 39Y1 of the aperture 39Y of the other color. Since the lens is originally a separate member from the housing, it can be replaced with a cylindrical lens 32M.

Figure 11:
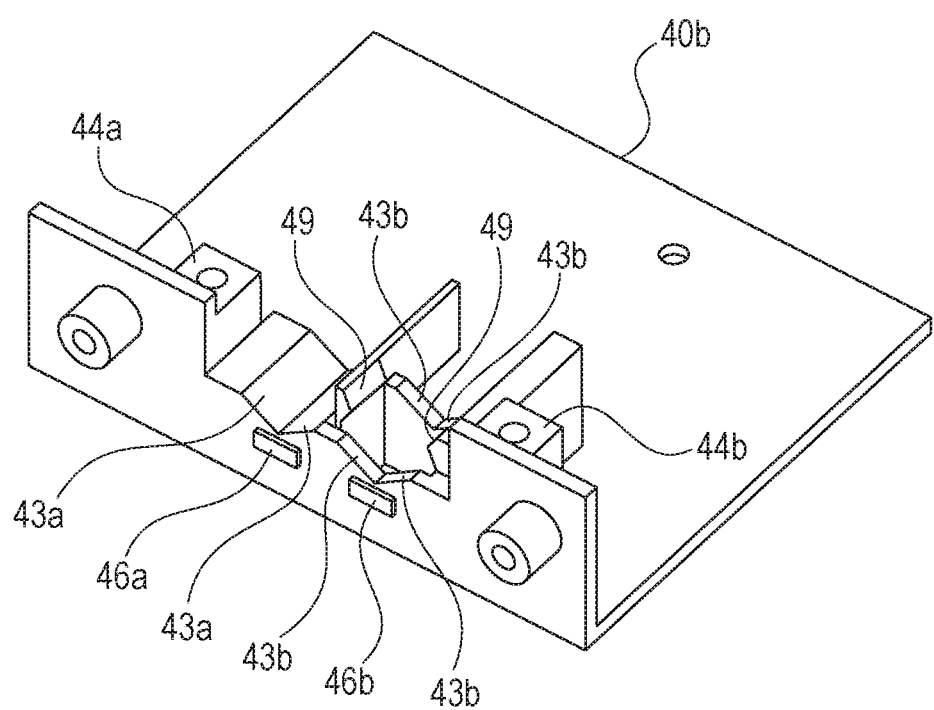
FIG. 11 is an explanatory view of a portion of a housing to which an M light source unit is attached.
Figure 12:
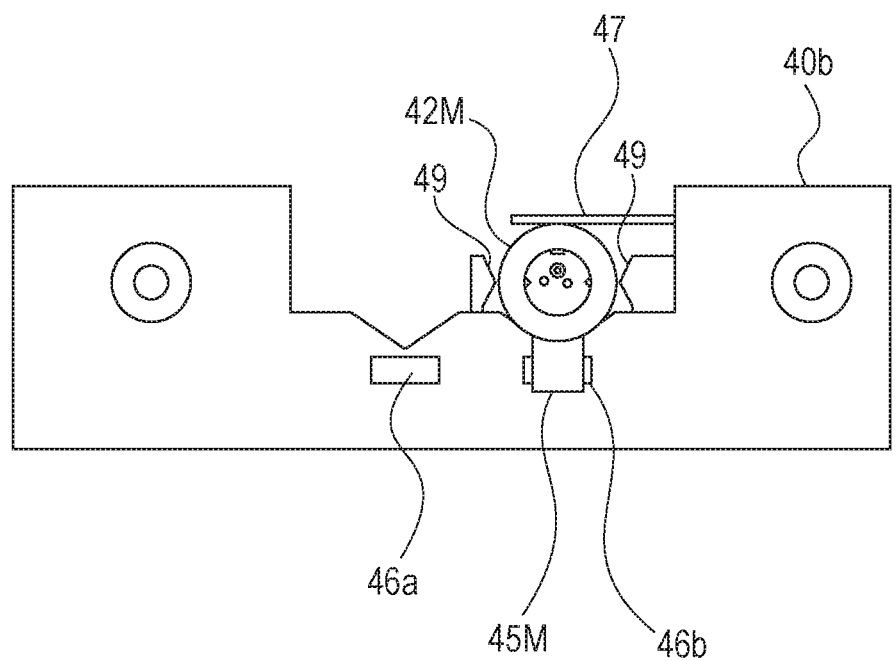
FIG. 12 is an explanatory view of a state in which the M light source unit is attached to the housing.

As for installation of the M light source unit 41M in the housing 40b, as shown in FIG. 11, a receiving portion 43b, a base 44b serving as a fixing portion for fixing a leaf spring 44 serving as a pressing member, and an abutting portion 46b are provided in the housing 40b in advance. That is, the housing 40b has a receiving portion 43b, a base 44b, and an abutting portion 46b in addition to the receiving portion 43a, the base 44a serving as a fixing portion, and the abutting portion 46a. The protruding portions 49 are opposed to each other with the light source holder 42K therebetween, and have a space where the light source holder 42M does not contact. The receiving portion 43b is provided at a position between the protruding portions 49 where the light source holder 42K serving as a first holding member does not contact. Therefore, the light source unit 40M can be installed in the portion where the black light source unit 40K is installed, and can be installed in completely the same manner as the light source units 40Y and 40C of the other color light source portions. As shown in FIG. 12, the outer periphery of the light source holder 42M serving as a second holding member contacts the receiving portion 43b. However, since the light source holder 42M has such an outer peripheral diameter that the outer periphery of the light source holder 42M does not contact the opposing protruding portions 49, the M light source unit 41M does not interfere with the protruding portions 49 of the housing 40b. With such a configuration, it is possible to install different types of light source units in the common housing 40a, 40b. In FIG. 12, reference sign 45M denotes a flange provided in the light source holder 42M serving as a second holding member. Similarly to the other light source holders 42Y and 42C serving as second holding members, positioning is performed by bringing the flange 45M into contact with the abutting portion 46b provided in the housing 40b in the optical axis direction shown in FIG. 9.

As described above, according to this embodiment, in order to make the spot diameter of the photosensitive drum of black smaller than the spot diameter of the other colors, the aperture diameter of black is made larger than the aperture diameter of the other colors. In addition, the light source unit of black is moved at least in the optical axis direction for adjustment, and then fixed to the housing. As a result, even if the aperture diameter of black is made larger than that of the other colors, the focal depth of the spot diameter equivalent to that of the other colors is ensured for black, and the image quality and character quality of black can be improved.

In the above-described embodiment, a scanning optical device is exemplified in which two laser beams are incident on a rotating polygon mirror 33 on one scanner motor 34 and one laser beam is scanned to each of opposite sides across the rotation axis of the rotating polygon mirror 33. However, the present disclosure is not limited to this, and this configuration can also be applied to the scanning optical device of the embodiment shown in FIG. 13.

Figure 13:
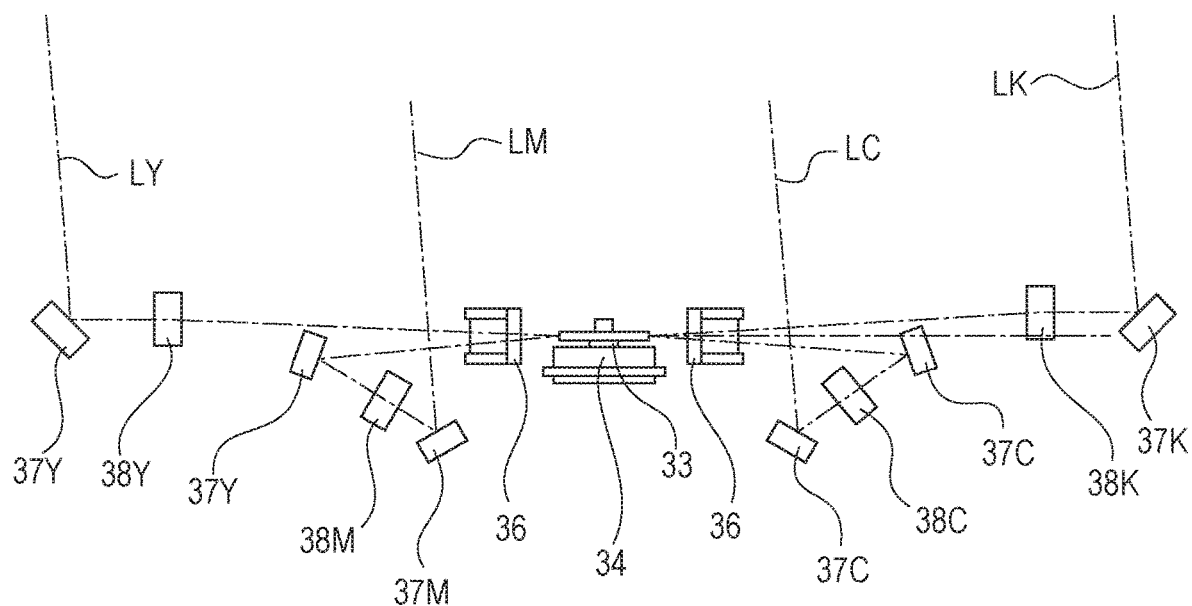
FIG. 13 is an explanatory view of a scanning optical device of another embodiment.

FIG. 13 shows a scanning optical device 50 in which four laser beams are incident on a rotating polygon mirror 33 on one scanner motor 34, and two laser beams are scanned to each of opposite sides across the rotation axis. In the scanning optical device 50, components having the same functions as those of the above-described scanning optical device 3 are denoted by the same reference signs, and description thereof is omitted.

Figure 14:
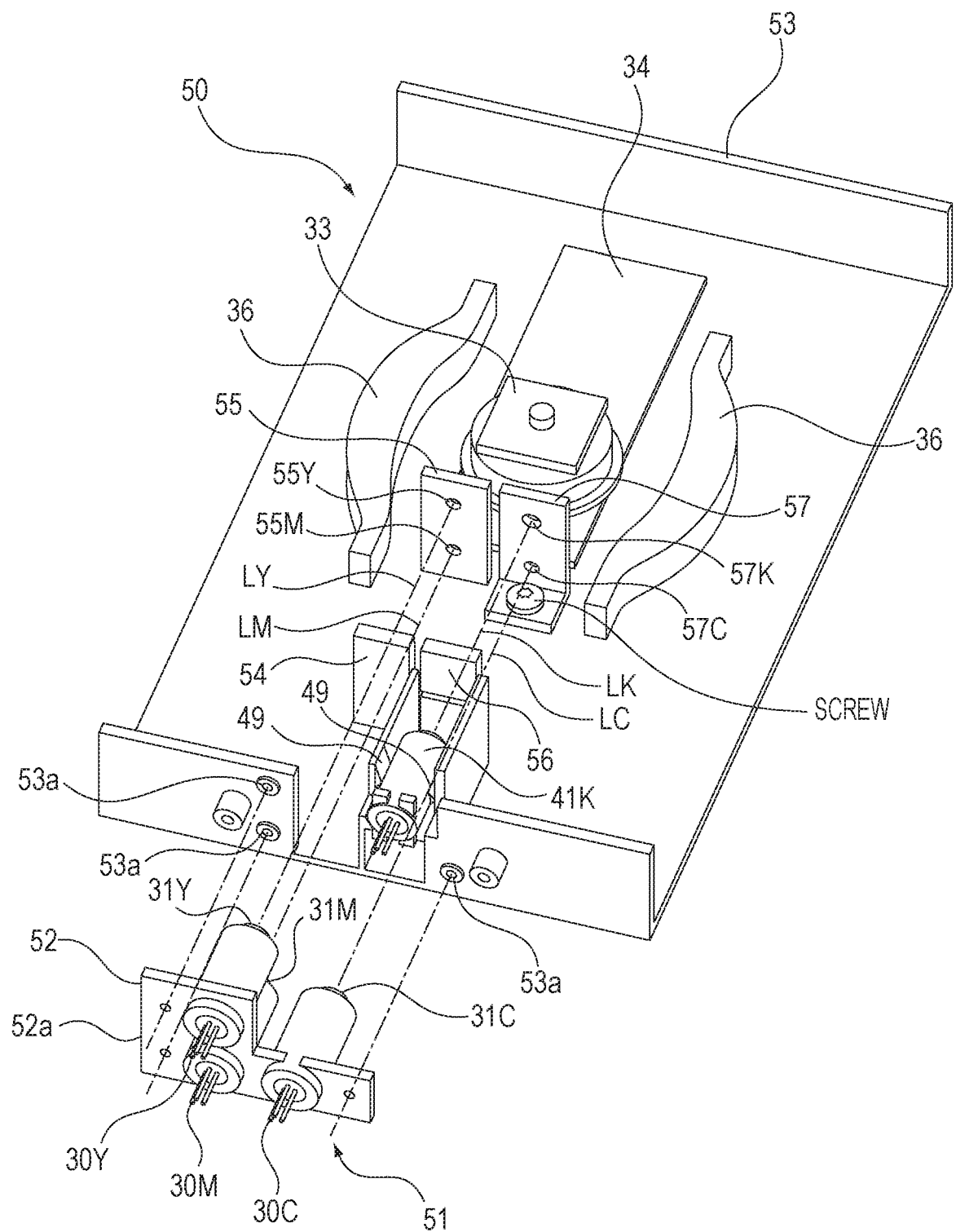
FIG. 14 is an explanatory view of a modification example of the light source portion.

The light source portion of the scanning optical device 50 is shown in FIG. 14. As in FIG. 13, components having the same functions as those of the above-described scanning optical device 3 are denoted by the same reference signs, and description thereof is omitted.

In the scanning optical device 50, since four light sources are arranged together, semiconductor lasers 30Y, 30M, and 30C and collimator lenses 31Y, 31M, and 31C can be held with one integral light source holder 52 as a color light source unit 51.

After adjusting the positions of the collimator lenses of the color light source unit 51, the color light source unit 51 is fixed to the housing 53 with screws (not shown with the flange 52a of the light source holder 52 abutted against abutting portions 53a of the housing 53.

The configuration of the black K light source unit, the method for focus adjustment, and the configuration of the housing 53 side are the same as those of the scanning optical device 3A.

In this embodiment, a laser beam LY passes through the upper parts of the cylindrical lens 54 and the aperture 55, a laser beam LM passes through the lower parts of the cylindrical lens 54 and the aperture 55, a laser beam LK passes through the upper parts of the lens 56 and the aperture 57, and a laser beam LC passes through the lower parts of the lens 56 and the aperture 57.

The upper part of the lens 56 is an anamorphic lens and the lower part is a cylindrical lens. The aperture diameter 57K in the upper part of the aperture 57 is larger than the other aperture diameters 55Y, 55M, and 57C. The aperture 57 is removably fixed to the housing 53 with a screw.

Even when the scanning optical device 50 is configured as described above, the same effect as the above-described embodiment can be obtained.

In the above-described embodiment, a photosensitive drum is exemplified as an object to be scanned. However, the present disclosure is not limited to this, and another object to be scanned such as a belt-like photosensitive body may be used.

In the above-described embodiment, a leaf spring is exemplified as a pressing member that presses the light source holder serving as a second holding member against the receiving portion, but the present disclosure is not limited to this. Any other pressing member such as an elastic member made of resin may be used as long as it presses the light source holder against the receiving portion.

In the above-described embodiment, a configuration in which a pressing member is fixed to a base with a screw is exemplified as a fixing portion to which a pressing member pressing the light source holder serving as a second holding member to the receiving portion is fixed. However, the present disclosure is not limited to this, and another configuration may be used as long as it is a fixing portion to which a pressing member is fixed.

In the above-described embodiment, a printer is exemplified as an image forming apparatus, but the present disclosure is not limited to this. Other image forming apparatuses such as copying machines and facsimile machines, or other image forming apparatuses such as a multifunction apparatus combining these functions may be used. The present disclosure is not limited to an image forming apparatus in which an intermediate transfer body is used, toner images of respective colors are sequentially superimposed and transferred to the intermediate transfer body, and the toner images borne by the intermediate transfer body are collectively transferred to a recording material. An image forming apparatus may be used in which a recording material bearing member is used, and toner images of respective colors are sequentially overlapped and transferred to a recording material borne by the recording material bearing member. By applying the present disclosure to the scanning optical device used in these image forming apparatuses, the same effect can be obtained.

According to the present disclosure, it is possible to reduce the spot diameter of a laser beam focused on an object to be scanned from one of a plurality of light sources, and to maintain image quality without reducing the depth at the spot diameter.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2017-187434 filed Sep. 28, 2017, which is hereby incorporated by reference herein in its entirety.

What is claimed is:

1. A scanning optical device comprising:
   a first holding member holding a first light source;
   a second holding member holding a second light source;
   a first aperture member shaping a laser beam emitted from the first light source;
   a second aperture member shaping a laser beam emitted from the second light source;
   a deflection scanning unit deflecting and scanning the laser beams from the light sources passing through the aperture members, the deflection scanning unit includes a rotational polygon mirror reflecting the laser beams from the light sources passing through the aperture members;
   scanning lenses focusing the laser beams from the light sources deflected and scanned by the deflection scanning unit on objects to be scanned corresponding to the light sources;
   a housing member holding the first and second holding members, the first and second aperture members, the deflection scanning unit, and the scanning lenses;
   protruding portions provided in the housing member and used for fixing the first holding member to the housing member with an adhesive; and
   adhesion portions extending in the emission direction of the laser beam from the light source and provided in the first holding member, the adhesion portions being opposed to the protruding portions of the housing member so as to be movable in the emission direction of the laser beam from the light source,
   wherein a spot diameter of the laser beam emitted from the first light source, passing through the first aperture member, and focused on the object to be scanned, is smaller than the spot diameter of the laser beam emitted from the second light source, passing through the second aperture member, and focused on the object to be scanned,
   wherein a focal depth at the spot diameter of the laser beam emitted from the first light source, passing through the first aperture member, and focused on the object to be scanned, is adjusted by moving the first holding member at least in the emission direction, after which the adhesion portions and the protruding portions are bonded with the adhesive, so that the positioned first holding member is fixed to the housing member, and
   wherein the adhesion portions are not provided in the second holding member.

2. The scanning optical device according to claim 1,
   wherein the first aperture member and the second aperture member each have a hole through which only part of the laser beam passes, and
   wherein the diameter of the hole of the first aperture member through which the laser beam from the first light source passes is larger than the diameter of the hole of the second aperture member through which the laser beam of the second light source passes.

3. The scanning optical device according to claim 1, wherein the first aperture member is fixed to the housing member by a screw so as to be detachably attached to the housing member.

4. The scanning optical device according to claim 1, further comprising
   a first receiving portion provided in the housing member and that receives the first holding member and a second receiving portion that receives the second holding member, the receiving portions extending in a direction orthogonal to the emission direction of the light source,
   a fixing portion that is provided in the housing member and to which a pressing member, pressing the second holding member against the second receiving portion, is fixed, and
   an abutting portion that is provided in the housing member and against which a flange provided in the second holding member is abutted in the emission direction of the light source,
   wherein the second holding member is brought into contact with the second receiving portion and abutted against the abutting portion, and the pressing member is fixed to the fixing portion, whereby the second holding member is positioned and fixed to the housing member.

5. The scanning optical device according to claim 4,
   wherein the protruding portions are opposed to each other with the first holding member therebetween, are contiguous with the first receiving portion, and provide a space between the first holding member and the first receiving member when the first holding member is in contact with the protruding portions.

6. The scanning optical device according to claim 1,
   wherein the outer shape of the holding members is cylindrical, and
   wherein the outer peripheral diameter of the first holding member is smaller than that of the second holding member.

7. The scanning optical device according to claim 1, wherein
   the protruding portions are protruded such that their tips are opposed to each other with the first holding member therebetween, and the adhesion portions are protruded such that their tips face the tips of the protruding portions.

8. The scanning optical device according to claim 1, wherein
the adhesion portions are opposed to the protruding portions of the housing member so as to be movable in the emission direction of the laser beam from the light source, in a direction of a rotation axis of the rotational polygon mirror, and in a direction orthogonal to both the emission direction of the laser beam from the light source and the direction of the rotation axis.

9. An image forming apparatus comprising:
a scanning optical device according to claim 1; and
first and second photosensitive drums on the surfaces of which electrostatic latent images are formed by being scanned with laser beams emitted from the scanning optical device.

10. A scanning optical device comprising:
a first holding member holding a first light source;
a second holding member holding a second light source;
a first aperture member shaping a laser beam emitted from the first light source;
a second aperture member shaping a laser beam emitted from the second light source;
a deflection scanning unit deflecting and scanning the laser beams from the light sources passing through the aperture members;
scanning lenses focusing the laser beams from the light sources deflected and scanned by the deflection scanning unit on objects to be scanned corresponding to the light sources;
a housing member holding the first and second holding members, the first and second aperture members, the deflection scanning unit, and the scanning lenses;
a first receiving portion provided in the housing member and that receives the first holding member and a second receiving portion that receives the second holding member, the receiving portions extending in a direction orthogonal to the emission direction of the light source;
a fixing portion that is provided in the housing member and to which a pressing member, pressing the second holding member against the second receiving portion, is fixed; and
an abutting portion that is provided in the housing member and against which a flange provided in the second holding member is abutted in the emission direction of the light source,
wherein the first holding member is held, with respect to the housing member, only through an adhesive, in the emission direction of the laser beam from the light source, and
wherein the second holding member is brought into contact with the second receiving portion and abutted against the abutting portion, and the pressing member is fixed to the fixing portion, whereby the second holding member is positioned and fixed to the housing member.

11. An image forming apparatus for forming a toner image on a recording material, comprising:
a first photosensitive member;
a second photosensitive member;
a third photosensitive member;
a fourth photosensitive member;
a first scanning optical device configured to scan the first photosensitive member by a first laser beam and configured to scan the second photosensitive member by a second laser beam, the first scanning optical device includes:
a first light source configured to emit the first laser beam in accordance with image information;
a second light source configured to emit the second laser beam in accordance with image information;
a first cylindrical holding member configured to hold the first light source;
a second cylindrical holding member configured to hold the second light source;
a first aperture member configured to shape the first laser beam emitted from the first light source;
a second aperture member configured to shape the second laser beam emitted from the second light source;
a first deflection scanning unit configured to deflect the first and second laser beams passing through the first and second aperture members, the first deflection scanning unit includes a first rotational polygon mirror reflecting the first and second laser beams passing through the first and second aperture members;
a first housing member configured to hold the first and second cylindrical holding members, the first and second aperture members, and the first deflection scanning unit;
a second scanning optical device configured to scan the third photosensitive member by a third laser beam and configured to scan the fourth photosensitive member by a fourth laser beam, the second scanning optical device includes
a third light source configured to emit the third laser beam in accordance with image information;
a fourth light source configured to emit the fourth laser beam in accordance with image information;
a third cylindrical holding member configured to hold the third light source;
a fourth cylindrical holding member configured to hold the fourth light source;
a third aperture member configured to shape the third laser beam emitted from the third light source;
a fourth aperture member configured to shape the fourth laser beam emitted from the fourth light source;
a second deflection scanning unit configured to deflect the third and fourth laser beams passing through the third and fourth aperture members, the second deflection scanning unit includes a second rotational polygon mirror reflecting the third and fourth laser beams passing through the third and fourth aperture members;
a second housing member configured to hold the third and fourth cylindrical holding members, the third and fourth aperture members, and the second deflection scanning unit;
wherein the second housing member is common with the first housing member,
wherein the second aperture member is replaceably fixed to the first housing member with a screw and the fourth aperture member is replaceably fixed to the second housing member with a screw, and
wherein a diameter of a hole of the first aperture member, a diameter of a hole of the second aperture member, and a diameter of a hole of the third aperture member are the same, and a diameter of a hole of the fourth aperture member is different from the diameter of the other three holes.

12. The image forming apparatus according to claim 11, wherein a yellow toner image is formed on the first photosensitive member, a magenta toner image is formed on the second photosensitive member, a cyan toner image is formed on the third photosensitive member, and a black toner image is formed on the fourth photosensitive member.

* * * * *